UNITED STATES PATENT OFFICE.

HENRY A. ALDEN, OF FISHKILL, NEW YORK, ASSIGNOR TO NEW YORK RUBBER COMPANY.

IMPROVEMENT IN THE MANUFACTURE OF HOSE AND FLEXIBLE TUBES.

Specification forming part of Letters Patent No. 37,192, dated December 16, 1862.

*To all whom it may concern:*

Be it known that I, HENRY A. ALDEN, of Fishkill, in the county of Dutchess and State of New York, have invented certain new and useful Improvements in Waterproofing Hose; and I hereby declare the following to be a full, clear, and exact description of the same.

My invention consists in a new process or method of waterproofing hose by internal application, under pressure, of such liquid or semi-liquid india-rubber, gutta-percha, or other cementing substance or compound as that by subsequent exposure to air or heat or by being otherwise treated shall form a dry, flexible coating impervious to water.

To enable others skilled in the art to make and use this my invention, I shall now proceed to describe the manner in which the same is or may be carried into effect.

I take the woven tube—such as I have heretofore used for the manufacture of water-proof hose—and suspend it at one end to a scaffolding made expressly for it, or to any other convenient elevated point at or about the works where the operation or manufacture is being carried on. The upper end of this tube is left open, while its lower end is closed by a tie, preferably over a plug previously inserted. The tube is thus ready to receive the compound, which may be a suitable caoutchouc or gutta-percha solution prepared to present requisite fluid consistency, so as to allow of its being poured into the tube.

My invention not relating to the compound, but to the peculiar method of application to hose, and the manner of preparing or compounding the liquid rubber or gutta-percha composition being well known to those familiar with the art to which this my invention pertains, it is deemed unnecessary here particularly to describe that branch of the manufacture which relates to the production of the compound itself. Suffice to say that it may be made of the usual ingredients with more or less of the solving agent or agents, according to the fluidity required. It may contain ingredients which render the compound vulcanizable by heat; or it may be made without such ingredients, constituting a cementing substance whose fluidity may be maintained for a given length of time and become dry and flexible when afterward exposed to air or to heat. The tube, on being filled with the compound, is allowed to remain in suspension for a few minutes, until, under the influence of pressure due to the superincumbent weight of the column of liquid, the interstices in the fabric of the tube become perfectly imbibed.

It will be readily understood that the lower portion of the tube will be more perfectly acted upon and the compound will be caused more thoroughly to penetrate on account of the pressure being greater there than in the upper part.

To equalize the pressure in all its parts, and to produce a uniform result throughout the whole length of the tube, I invert the tube, taking care first to close the upper end. When the tube is suspended upside down the plug on the top may be removed and the filled tube allowed to remain in the last position for the same time as before. At this stage of the operation the liquid mass, or that part of the compound which shall have remained in a liquid state, is permitted to run out. The plug at the under side is for this purpose removed, and the liquid is collected in a bucket or tank to be used subsequently in another operation. The pressure to which the liquid in the tube is exposed causes the inflation of the tube and gives it its most perfect cylindrical shape, the interstices in the fabric of the hose, being filled or packed with the compound, will tend to preserve its cylindrical form. The tube, after being drained, I allow to hang until perfectly dry. If a vulcanizable compound be used, the hose is heated by passing a current of hot air or steam through the tube or otherwise. If the coating be insufficient, the operation, as above, may be repeated until requisite thickness of the coating is attained.

The hose produced in the manner above described is coated on the inside only, and answers many purposes; but when it is desired to obtain a hose coated with an impervious substance both on the inside and the outside I proceed as follows: I take the woven tube and place it in a trough as long as the tube, and fill with the rubber or gutta-percha compound or cement. Before placing the tube in the trough I close one of its ends, and when in the trough I apply to the other end a force-pump, by the means of which I forcibly inject the liquid mass of compound. The air contained in the tube will be expelled and the tube will be filled in its whole capacity with the compound. The complete expulsion of air from the tube will be indicated by the cessation of air-bubbles rising up through the liquid mass in the trough. The action of the force-pump, however, is kept up to maintain pressure in the tube and to cause it to be "set" while under pressure. The effect of the force-pump is substantially the same as that of the superincumbent weight of the column of liquid in the tube when filled according to the method first described, with the advantage of enabling the operator to regulate the pressure irrespective of the length of the tube. The last-described mode is more expeditious and convenient, and is otherwise preferable, particularly when the object in view is to obtain an inside and outside coat at one operation. The last-described mode of operating may also be applied to the making of hose coated on the inside only. The trough should then contain no compound, and the force-pump must be supplied from a separate tank containing the liquid coating mass. The tube is allowed to remain filled for a few minutes. The force-pump is then detached and the plug removed from the other end. If the trough contain no fluid mass, and an internally-coated hose be desired to be produced, a slight inclination may be given the trough, and consequently the hose, to allow the liquid to flow out. If convenient, the hose may be suspended to be drained and dried, &c. This mode of operation may be repeated until sufficient thickness of coating is attained. When finished the hose presents in an eminent degree the qualities of water-proof hose. It is durable, strong, and the coating becomes by use compacted, while the hose acquires permanency of shape.

To pack the hose for transportation without injuring it, it is deemed advisable to put into it bags filled with sawdust, cork chips, soapstone, or other similar material; or the sawdust, cork chips, &c., may be put directly into the hose without the intervention of the bag.

To facilitate the drawing of the filled bag into the hose it should be coated with soapstone.

Having thus described my invention and the manner in which the same is or may be carried into effect, I will state my claim as follows:

The herein-described process or method of waterproofing hose by internal application under pressure of such liquid or semi-liquid india-rubber, gutta-percha, or other cementing substance or compound as that by subsequent exposure to air or heat or by being otherwise treated shall form a dry, flexible coating impervious to water, and, when so waterproofed, the mode described of preserving the cylindrical form for the hose.

In testimony whereof I have signed my name to this specification before two subscribing witnesses.

HENRY A. ALDEN.

Witnesses:
JAMES MACKIN,
N. H. HUSTIS.